United States Patent
Ishii et al.

(10) Patent No.: US 8,493,618 B2
(45) Date of Patent: Jul. 23, 2013

(54) COLOR PROCESSING APPARATUS AND METHOD THAT CALCULATE AND COMBINE COLOR DATA OF DIFFUSE REFLECTION IN A LINE-OF-SIGHT DIRECTION AND COLOR DATA OF SPECULAR REFLECTION IN A LINE-OF-SIGHT DIRECTION, AND THAT CONVERT THE COMBINED COLOR DATA TO COLOR DATA IN A COLOR SPACE OF A MONITOR

(75) Inventors: Masatoshi Ishii, Tokyo (JP); Takashi Hanamoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 531 days.

(21) Appl. No.: 12/823,986

(22) Filed: Jun. 25, 2010

(65) Prior Publication Data

US 2011/0007333 A1    Jan. 13, 2011

(30) Foreign Application Priority Data

Jul. 13, 2009 (JP) .................................. 2009-165125

(51) Int. Cl.
H04N 1/60 (2006.01)
(52) U.S. Cl.
USPC ......... 358/1.9; 358/1.18; 358/3.06; 358/3.28; 358/527; 358/540
(58) Field of Classification Search
None
See application file for complete search history.

(56) References Cited

U.S. PATENT DOCUMENTS

| 7,515,299 | B2 * | 4/2009 | Asano ............................. 358/1.9 |
| 7,612,913 | B2 * | 11/2009 | Matsuzaki et al. .............. 358/1.9 |
| 7,948,622 | B2 * | 5/2011 | Kanamori et al. ............. 356/364 |
| 8,107,141 | B2 * | 1/2012 | Patrick et al. .................. 358/527 |
| 8,223,385 | B2 * | 7/2012 | Minhas ........................ 358/1.18 |
| 2002/0149546 | A1 * | 10/2002 | Ben-Chorin et al. ............ 345/32 |
| 2004/0201598 | A1 * | 10/2004 | Eliav et al. ..................... 345/698 |
| 2008/0218784 | A1 * | 9/2008 | Ben-Chorin et al. .......... 358/1.9 |
| 2009/0273819 | A1 * | 11/2009 | Hanamoto ..................... 358/500 |

FOREIGN PATENT DOCUMENTS

JP       9-046535 A     2/1997
JP    2007-026049 A     2/2007

* cited by examiner

Primary Examiner — Dung Tran
(74) Attorney, Agent, or Firm — Canon U.S.A., Inc., IP Division

(57) ABSTRACT

A color processing apparatus configured to simulate a print product output by a printer on a monitor. The apparatus includes a first conversion unit configured to convert color data representing an image of the simulation object into color data in a printer color space, a first calculation unit configured to calculate color data of diffuse reflection in a line-of-sight direction from color data in the printer color space, a second calculation unit configured to calculate color data in the printer color space and specular reflection color data, a third calculation unit configured to calculate color data of specular reflection in a line-of-sight direction from color data of specular reflection calculated using a parameter representing an exitance of the glossiness and colorless light-source color data, a combination unit configured to combine the color data of diffuse reflection and color data of specular reflection, and a second conversion unit configured to convert the combined color data to color data in the monitor color space.

4 Claims, 8 Drawing Sheets

COLOR PROCESSING APPARATUS AND METHOD THAT CALCULATE AND COMBINE COLOR DATA OF DIFFUSE REFLECTION IN A LINE-OF-SIGHT DIRECTION AND COLOR DATA OF SPECULAR REFLECTION IN A LINE-OF-SIGHT DIRECTION, AND THAT CONVERT THE COMBINED COLOR DATA TO COLOR DATA IN A COLOR SPACE OF A MONITOR

BACKGROUND OF THE INVENTION

1. Field of the Invention

The present invention relates to a color processing apparatus that is configured to simulate a print product output by a printer on a monitor, and to a method for the same.

2. Description of the Related Art

A print product that is printed using a printer or the like is output assuming that the print product is observed under illumination having a color temperature of 5000K, which is termed D50. Thus, when the print result is simulated in advance using a monitor of a personal computer or the like, processing is executed by assuming that the print product is observed under a 50K illumination. This type of simulation is termed a "soft proof" and the processing is executed using a color matching system (hereinafter referred to as "CMS"). There is also a technique for simulating the appearance of color in a print product when using illumination other than D50 (Japanese Patent Application Laid-Open No. 9-46535). Although the accuracy of these methods is affected by a profile stating the characteristics of the print media, the printer or the monitor, which is termed the color profile, or the characteristics of the engine executing the CMS, the approximate print result can be reproduced on the monitor.

On the other hand, there is a technique of reproducing the color of a fabric on a monitor using computer graphics (CG) (Japanese Patent Application Laid-Open No. 2007-26049). This technique effectively creates a highly accurate bidirectional reflectance distribution function (BRDF) of the fabric using measurement data obtained from one incidence direction, and uses the bidirectional reflectance distribution function to execute shading processing.

However the impression when viewing the actual print product does not only depend on the color, but also is considerably affected by the gloss characteristics of the colorant forming the print product. Therefore, a strange impression often results when the print product is compared with the result of a simulation on a monitor. In other words, a simulation which is closer to the actual object requires not only color but also the gloss characteristics to be simulated at the same time.

When reproducing gloss using a reflection model in conventional CG such as a Phong Model or a Lambert Model, there is the problem that the intensity or color of the glossiness, which varies due to differences in colorants, such as bronzing cannot be reproduced on a monitor. When a CG model is used, this is due to the fact that the color of the gloss depends on the whiteness or on the color of the light source, and is normally uniform. Bronzing is a phenomenon in which a color is created in reflection due to diffuse reflection of illumination light from the print surface and appears as a metallic gloss such as an iridescent color which is different to the original printed color depending on the angle of view.

SUMMARY OF THE INVENTION

A color processing apparatus configured to simulate a print product output by a printer on a monitor. The color processing apparatus includes a first conversion unit configured to convert color data representing an image of the simulation object into color data in a printer color space based on an illumination condition and a printer profile, a first calculation unit configured to calculate color data of diffuse reflection in a line-of-sight direction from color data in the printer color space using a diffuse reflection table corresponding to the illumination condition, a second calculation unit configured to calculate color data in the printer color space and specular reflection color data using a specular reflection table corresponding to the illumination condition, a third calculation unit configured to calculate color data of specular reflection in a line-of-sight direction from color data of specular reflection calculated using a parameter representing an exitance of the glossiness and colorless light-source color data, a combination unit configured to combine the color data of diffuse reflection in a line-of-sight direction and color data of specular reflection in a line-of-sight direction, and a second conversion unit configured to convert the combined color data to color data in a color space of the monitor.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments and features of the invention and, together with the description, serve to explain the present invention.

FIG. 8 is a flowchart illustrating the flow of the process until a 3D object other than the print product is displayed on the monitor.

DESCRIPTION OF THE EMBODIMENTS

Various exemplary embodiments, features, and aspects of the invention will be described in detail below with reference to the drawings.

Firstly in the present exemplary embodiment, a method will be described that is configured to reproduce gloss, including bronzing, and the color of a print product on a monitor using soft proof processing in a CG technique.

Figure 1:
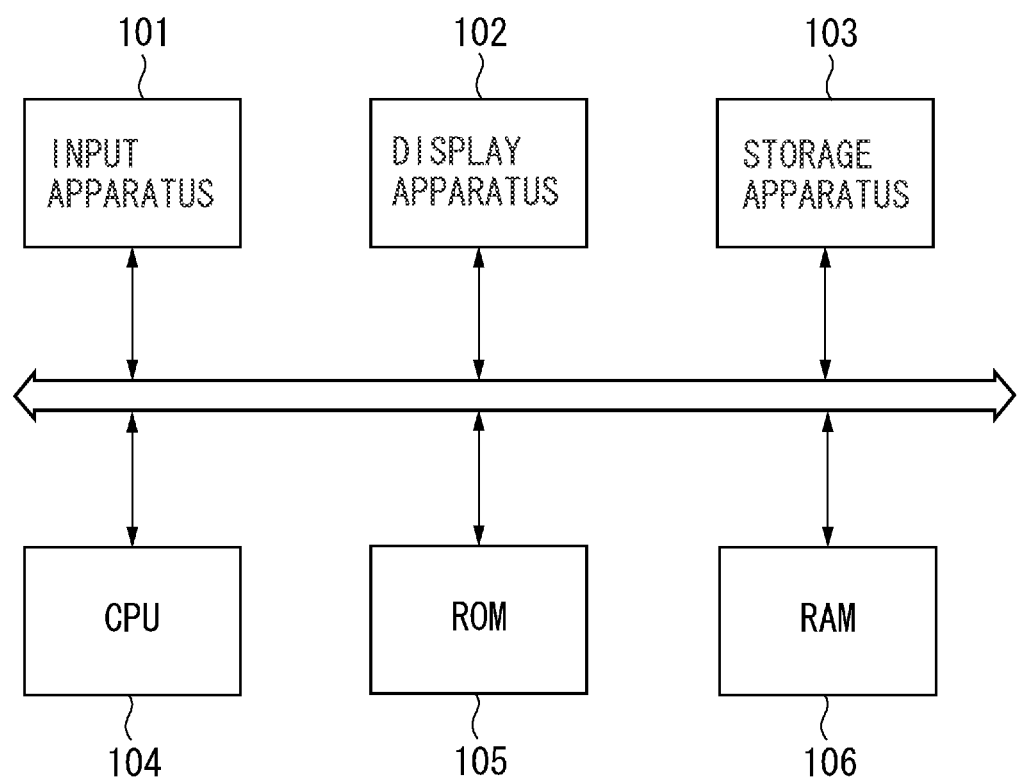
FIG. 1 is a block diagram illustrating a system configuration according a first exemplary embodiment of the present invention.

FIG. 1 is a block diagram illustrating the system configuration according a first exemplary embodiment of the present invention. An input apparatus 101 is configured to input data, or instructions, from a user and includes a keyboard or a pointing system such as a mouse. A display apparatus 102 is configured to display a graphical user interface (GUI) or the like, and is normally realized by a monitor such as a liquid crystal display or a cathode ray tube (CRT). A storage apparatus 103 is configured to store image data or programs, or the like, and normally uses a hard disk. A central processing unit (CPU) 104 controls the overall system. A read only memory (ROM) 105 and a random access memory (RAM) 106 configure a memory apparatus of the system and store data for use by the system, or programs executed by the system. The control program required for processing of the flowchart below is stored in the storage apparatus 103 and executed after being read into the RAM 106. The system configuration also includes various other constituent elements in addition to the above. However such elements do not form a feature of the present invention and therefore are omitted from the description. The configuration illustrated in FIG. 1 is an example to which a color processing apparatus is applied.

Figure 2:
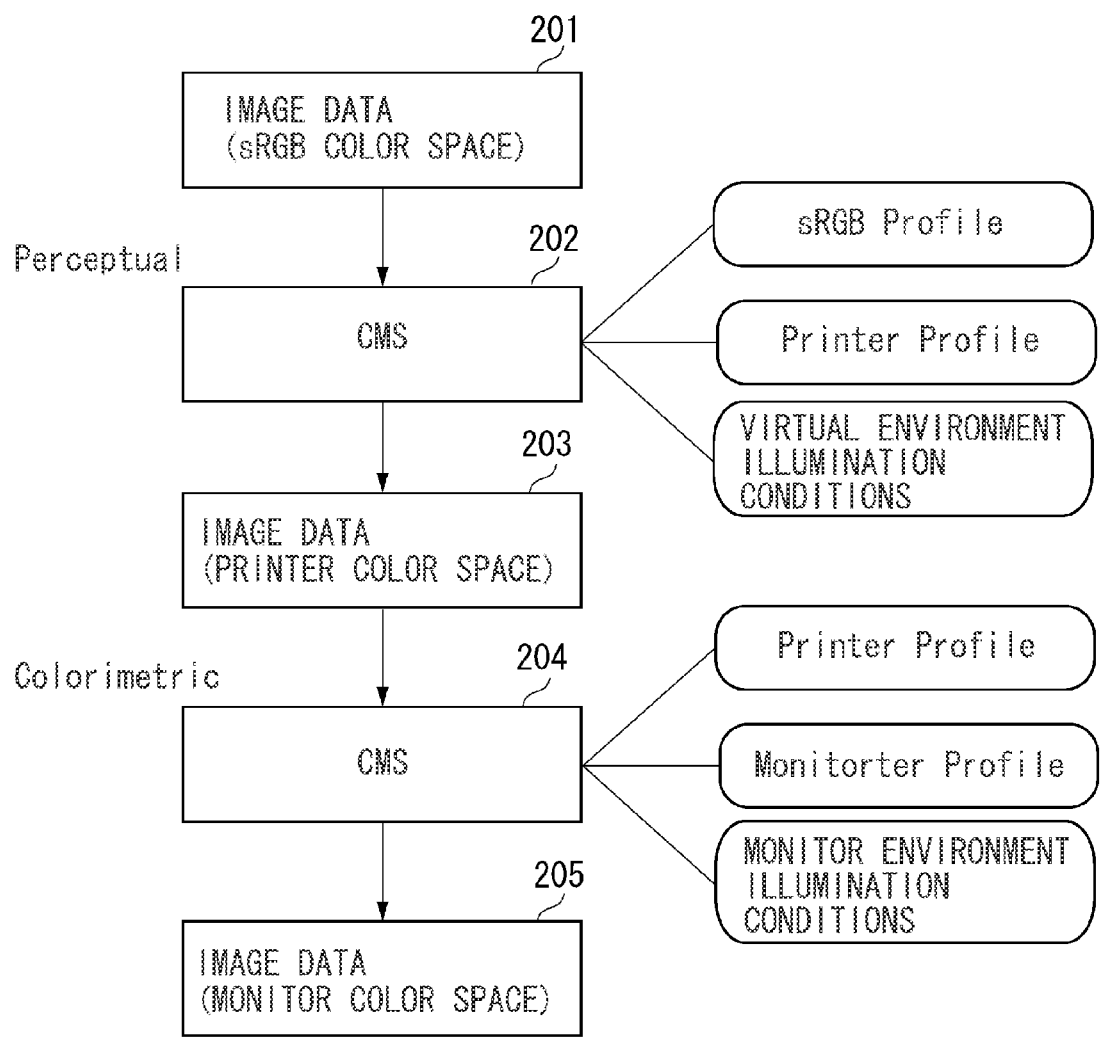
FIG. 2 illustrates a method of simulating on a monitor a color of a print product when image data in an sRGB color space is output by a printer.

FIG. 2 illustrates a method of simulating on a monitor a color of a print product when image data in an sRGB color space is output by a printer. Firstly, the image data 201 captured in the sRGB color space is converted to the printer color space. At this time, illumination conditions for the environment (virtual environment) where an input profile, output profile and print product are set, are designated for a CMS engine 202. Since the image data is an sRGB color space, as the input profile, the profile for the sRGB color space is designated. When the image data is not an sRGB color space, a profile related to the image is designated.

As the output profile, the printer profile is designated. The printer profile is prepared for each printer model, print media and print grade and, must be selected appropriately to the print conditions. As the illumination conditions, the color temperature of the illumination, or the type of fluorescent light (high color rendering type, three-wavelength type, standard type) is designated. Furthermore the CMS engine 202 may have any rendering intent (normally perceptual). The image data 201 is processed by the CMS engine 202 to thereby obtain image data 203 for the printer color space under the designated illumination conditions. If the color temperature of the illumination is low, the color value shifts towards orange, and when the color temperature is high, the color value shifts towards blue.

Next, the image data 203 is converted to the monitor color space. At this time, the input profile, the output profile and illumination conditions of the environment (monitor environment) for viewing the monitor are designated for a CMS engine 204. As the input profile, the same printer profile as that designated for the CMS engine 202 is designated. As the output profile, the monitor profile is designated. The monitor profile is distributed by the manufacturer, or is prepared by using a dedicated measurement apparatus. As the illumination conditions, the color temperature of the illumination, or the type of fluorescent light (high color rendering type, three-wavelength type, standard type) is designated. However the monitor is a self-illuminating device and therefore the appearance of the color displayed on the monitor is not greatly affected by the illumination conditions. Thus, the illumination conditions may be fixed to a 5000K high color rendering type. Normally, as the rendering intent, an absolute colorimetric is designated in which the chromaticity value does not vary. The image data 203 is processed by the CMS engine 204 to thereby obtain image data 205 for the monitor color space. The image displayed on the monitor according to the image data for the monitor color space simulates the print product.

Figure 3A:
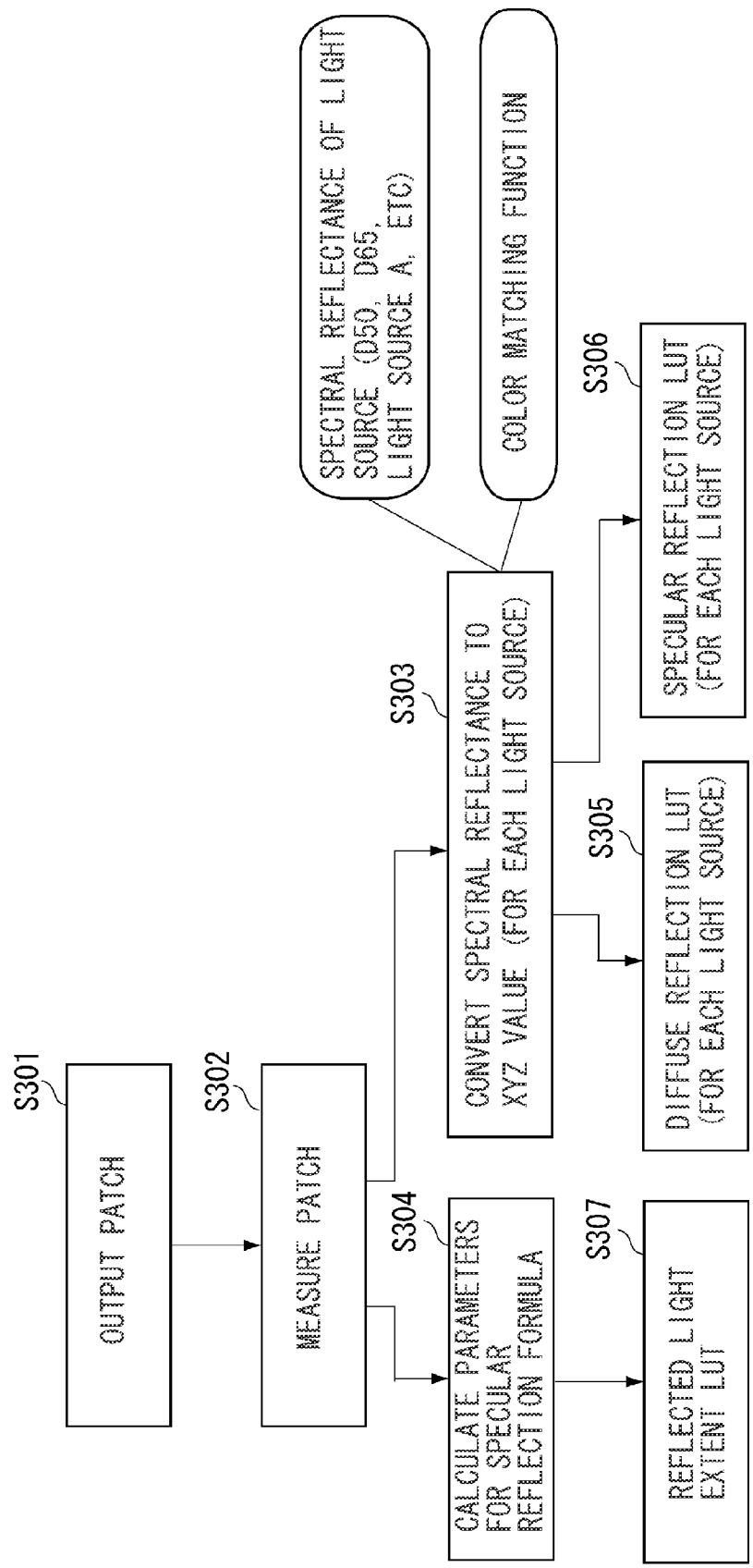
FIGS. 3A and 3B illustrate a process of creating a LUT for a diffuse reflection component and a LUT for a specular reflection component.
Figure 3B:
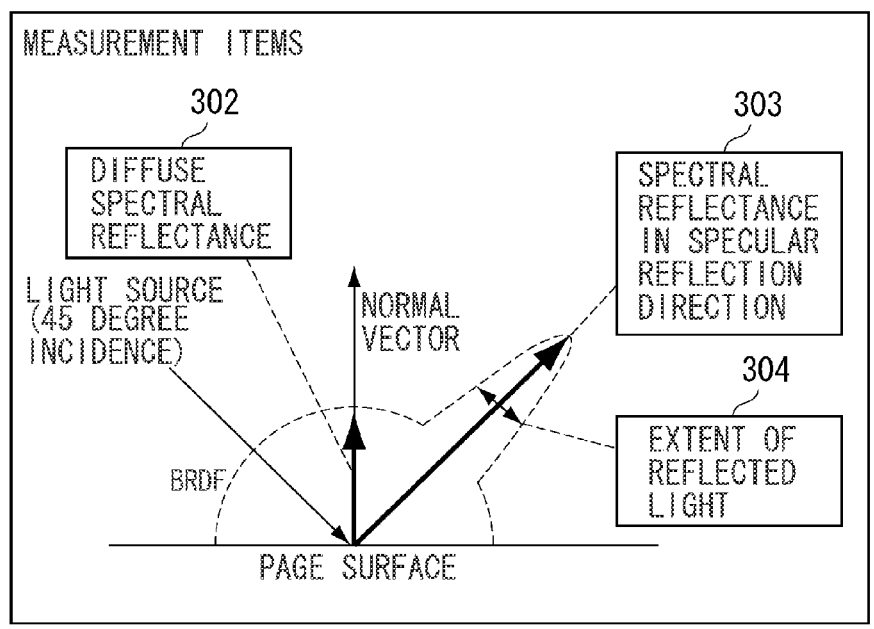

FIGS. 3A-B illustrate a process of creating a look-up table (LUT) for a diffuse reflection component and a LUT for a specular reflection component. FIG. 3A is a flowchart illustrating the processing flow for creating a LUT for a diffuse reflection component and a LUT for a specular reflection component. Firstly in step S301, the CPU 104 prepares image data for a color patch (hereafter termed "patch image data") and prints the patch image data with the printer. The patch image data is data which divides each RGB color into 9 grids and therefore is data for 729 (9×9×9) colors by combining the data. The CPU 104 prints the patch image data using paper and a printer that is the soft proof target. Printing must be executed in the settings for the printer device in which the color matching function is OFF. The processing to this point is the same as a method used when preparing a general printer profile.

In step S302, the CPU 104 measures the output patch image data with a measurement apparatus. The measurement items are illustrated in FIG. 3B. The measurement apparatus illuminates light from a 45° direction according to the respective patch image data and measures three items, namely the spectral reflectance in the diffuse direction 302, the spectral reflectance in the specular reflection direction 303 and the extent of the reflected light 304 for the incident light. The measurements are executed using a general measurement apparatus such as a Gonio photometer or a haze meter.

In step S303, the CPU 104 converts the spectral reflectance in the diffuse direction and the spectral reflectance in the specular reflection direction of the respectively measured patch image data, into an XYZ value for each type of light source. Then the CPU 104 associates converted XYZ values respectively with an RGB value of patch image data and prepares a diffuse reflection LUT (RGB input, XYZ output) 305 and a specular reflection LUT (RGB input, XYZ output) 306 for the number of light source types. The diffuse reflection LUT 305 is prepared using the XYZ value calculated based on the spectral reflectance in the diffuse direction, and the specular reflection LUT 306 is prepared using the XYZ value calculated based on the spectral reflectance in the specular reflection direction. The XYZ value is calculated by multiplying a color matching function by a dispersion spectrum of the light source and further by the spectral reflectance.

For the dispersion spectrum of the light source, standard values such as D50, D65 or the like may be used or may be measured and acquired by using a measurement apparatus such as a spectral radiance meter with respect to an arbitrary light source. In the present exemplary embodiment, the types of light sources are D50, D65 and A source, however the types of light sources may be increased or decreased as required. In this manner, a diffuse reflection LUT (diffuse reflection look-up table) 305 and a specular reflection LUT (specular reflection look-up table) 306 are prepared with respect to the D50, D65 and A light sources respectively (according to the respective illumination conditions). In other words, three diffuse reflection LUTs 305 and three specular reflection LUTs 306 are prepared.

On the other hand, with respect to the extent of the reflected light 304, in step S304, the CPU 104 calculates a parameter n for a specular reflection formula from the data measured for each patch image data, and stores the parameter n as an extent of the reflected light LUT in the RAM 106. In the present exemplary embodiment, the 729 color LUT for each of the nine RGB color grids is generated by adding both an interpolated accuracy and interpolated speed for the LUT. However there is no limitation to the grid number or the grid interval, and the grid number may be increased to improve the accuracy.

Figure 4:
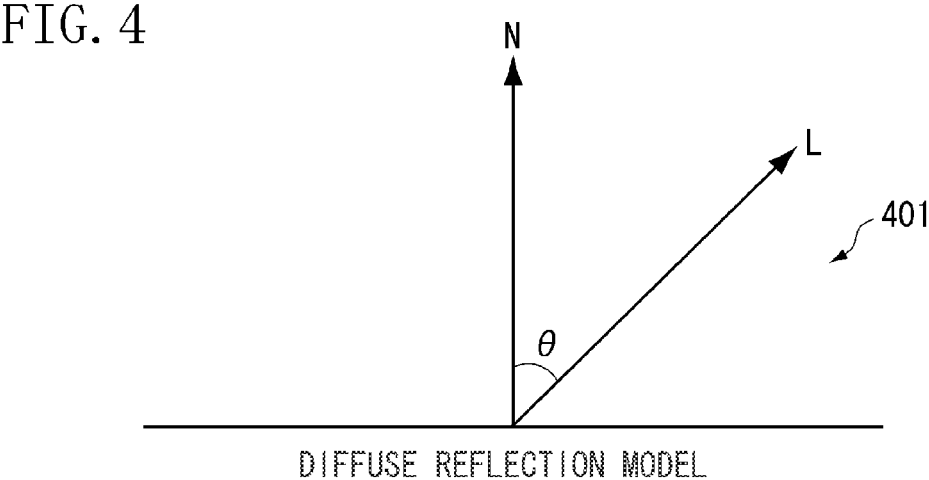
FIG. 4 illustrates a method for calculating a reflection color of an object in CG.
Figure 4:
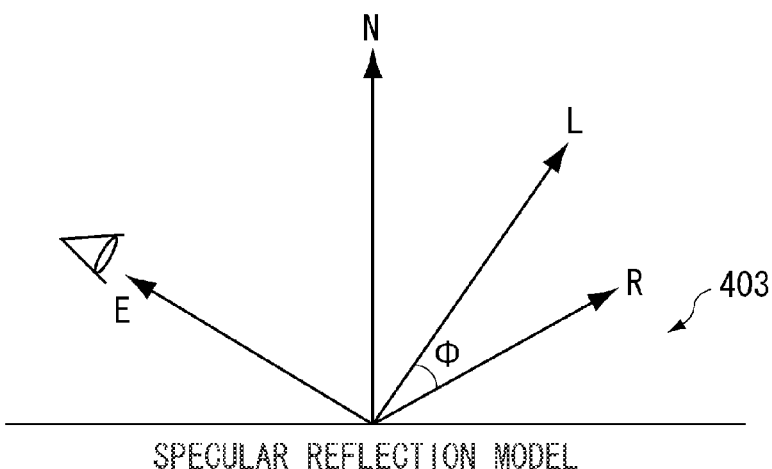

FIG. 4 illustrates a method for calculating a reflection color of an object in CG. In the figure, reflected components generally include diffuse reflection and specular reflection. Diffuse reflection has a great effect on the color of an object and a diffuse reflection color is calculated using a diffuse reflection model. Specular reflection has a great effect on the glossy color of the object and a specular reflection color is calculated using a specular reflection model. After calculating the diffuse reflection color and the specular reflection color as to the respective models, the reflection color of the object is determined by adding the two results. Herein it is assumed that a reflection color is all an RGB value in a sRGB color space.

The diagram 401 in FIG. 4 illustrates the general concept of a diffuse reflection model. A vector N is a normal vector expressing the direction of a normal to the object surface and a vector L is a light-source vector expressing a direction of a light source. The formula 402 illustrates a formula for calculation of a diffuse reflection color based on this model. The parameter Id represents the color of the light source. The parameter Kd represents the surface color of the object and the reflection intensity of the surface color. N·L is the inner product of the light-source vector L and the reflection vector R.

The diagram 403 in FIG. 4 represents the general concept of the specular reflection model. The vector N is a normal vector representing the direction of a normal to the object surface, a vector L is a light-source vector representing a direction of a light source, and the vector E is a line-of-sight vector in a line of sight direction. The vector R is the reflection vector of the vector E. The formula 404 represents a formula for calculation of a diffuse reflection color based on this model. The parameter Is represents the color of the light source. The parameter Id is the same parameter as above. The parameter Ks represents the color of the gloss component and its reflection intensity. L·R is the inner product of the light-source vector L and the reflection vector R. The parameter n represents the level of exitance of the glossiness and is calculated using the extent LUT (S307) for reflected light illustrated in FIG. 3A. In the respective models, when the diffuse reflection color Cd and the specular reflection color Cs are obtained, the reflection color C for the final object can be calculated from the formula 405.

Figure 5:
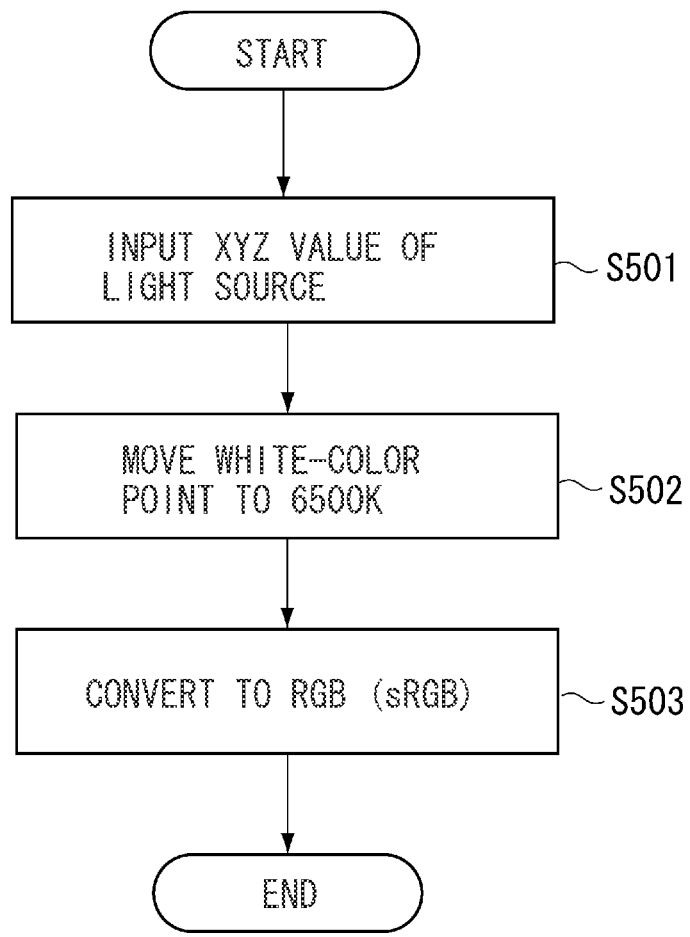
FIG. 5 is a flowchart illustrating a method of determining a light source color in CG.

FIG. 5 is a flowchart illustrating a method of determining a light source color in CG. In step S501, the CPU 104 inputs an XYZ value of the light source.

Then in step S502, the CPU 104 conforms the white point in the XYZ color space to an sRGB color space, and shifts it to 6500K. A 3×3 matrix conversion is used in this process.

In step S503, the CPU 104 converts from an XYZ value to an RGB value and finishes the process. A general 3×3 matrix conversion is used in this conversion. An RGB value in the sRGB color space for the light-source color is obtained in this process.

Figure 6A:
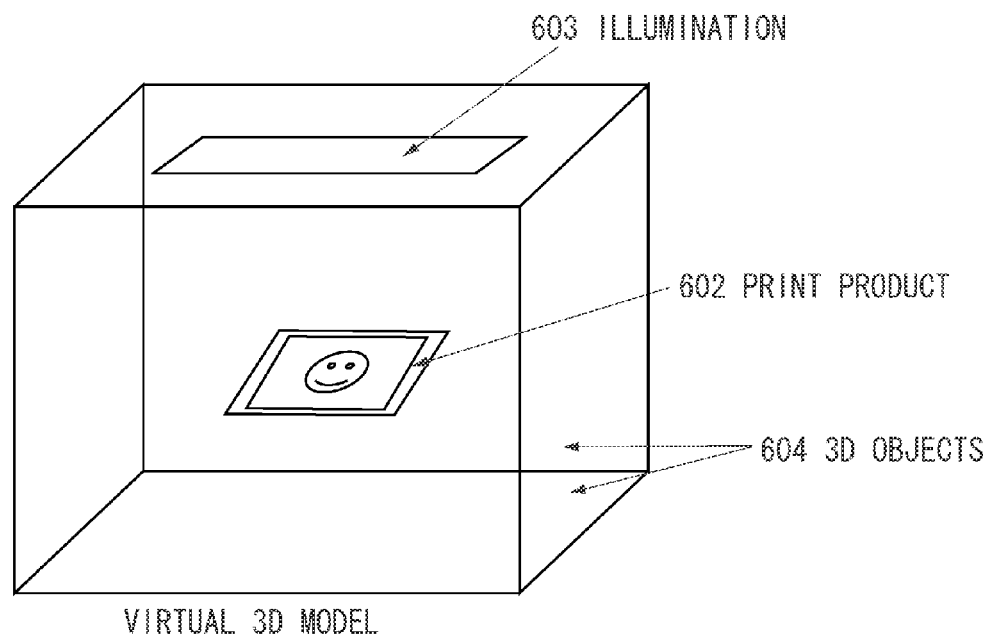
FIGS. 6A and 6B illustrate a 3D model of a virtual environment in which a gloss component is added to the print product in CG.
Figure 6B:
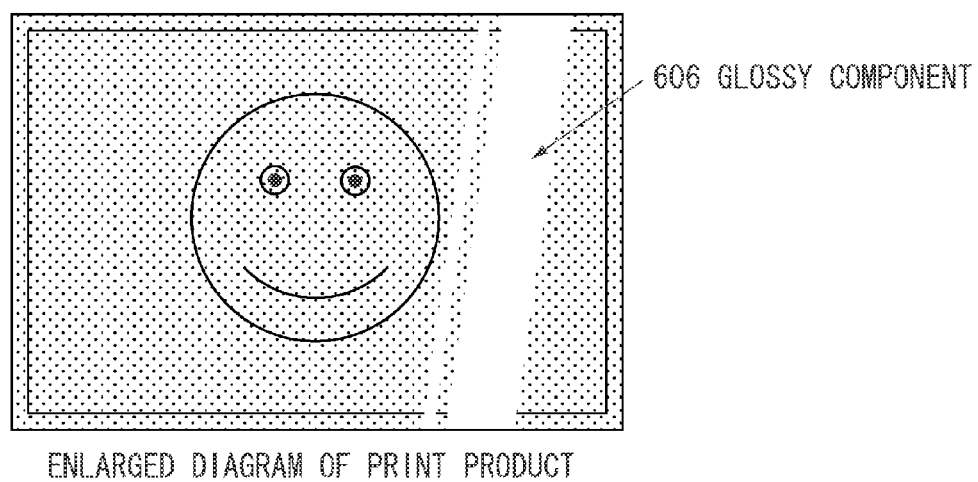

FIGS. 6A-B are a 3D model (virtual 3D space) of a virtual environment for adding a gloss component to the print product (object) in CG. As illustrated in FIG. 6A, firstly a 3D object 604 such as a wall, ceiling, floor or the like is installed in the virtual environment.

Then illumination 603 is installed. Light of the light source color calculated in FIG. 5 is radiated from this illumination 603. Finally, the print product (object) 602 is disposed in proximity to the center of the virtual space. In this environment, light reflected by the illumination in the reflection model illustrated in FIG. 3B is reflected on the print product 602 and the 3D object 604, and the resulting reflection color can be calculated. The 3D object 604 is arranged in addition to the print product the virtual environment so that the environment approximate to the actual environment can be realized such as reflections onto the print product 602. When the print product 602 is expanded, as illustrated by the print product expanded view in FIG. 6B, the illumination 603 is reflected and the gloss component 606 is displayed.

Figure 7:
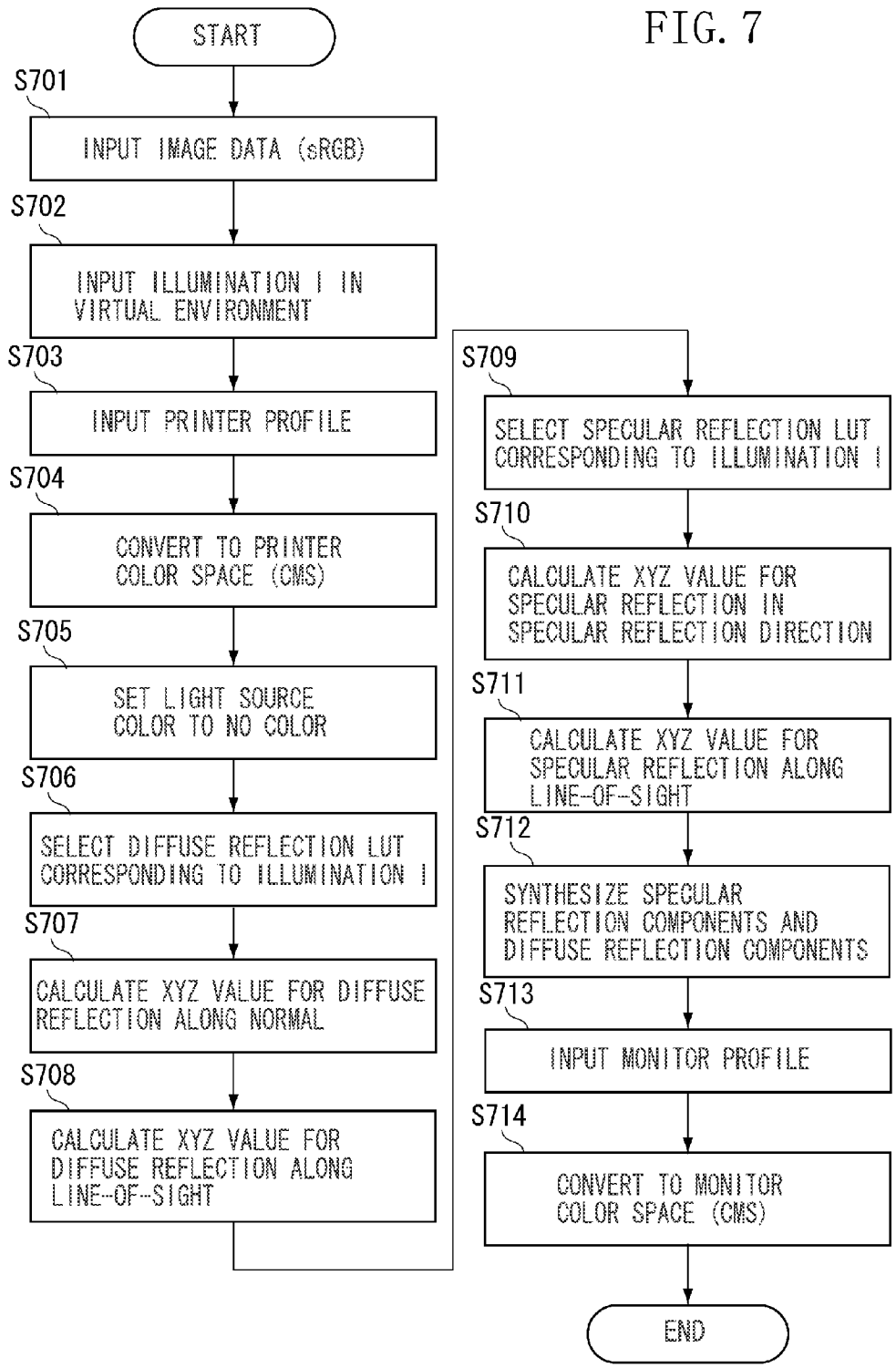
FIG. 7 is a flowchart illustrating the flow of the processing from input of the image until its output on the monitor.

FIG. 7 is a flowchart illustrating the flow of the processing from input of the image until output on the monitor.

In step S701, the CPU 104 executes a soft proof process and inputs the image data for display as a print product 602 in the virtual 3D model illustrated in FIG. 6A. The image data color space herein is an sRGB color space.

In step S702, the CPU 104 inputs an illumination condition I in the virtual 3D model environment in FIG. 6A.

In step S703, the CPU 104 inputs a printer profile corresponding to the printer and the paper as a target for the soft proof.

In step S704, the CPU 104 converts the image data in the sRGB color space input in step S701 into image data 203 for a printer color space using the CMS engine according to the process illustrated in FIG. 2. As the rendering intent, perceptual is designated and the process is executed using the illumination conditions I input in step S702 and the printer profile input in step S703.

In step S705, the CPU 104 sets the light-source color of the illumination 603 to colorless. Colorless as used herein means (X, Y, Z)=(1.0, 1.0, 1.0) when the XYZ value is normalized from 0 to 1.0.

In step S706, the CPU 104 selects the diffuse reflection LUT corresponding to the illumination conditions input in step S702 from the diffuse reflection LUT 305 for each light source prepared using the process illustrated in FIGS. 3A-B.

In step S707, the CPU 104 calculates the XYZ value for the diffuse reflection components in a direction which is normal with respect to the paper surface by converting the image data 203 for the printer color space using the selected diffuse reflection LUT.

In step 708, the CPU 104 calculates the XYZ value (diffuse reflection color) for the diffuse reflection component in the line-of-sight direction using the diffuse reflection formula 402. Herein Kd in the diffuse reflection formula 402 is an XYZ value calculated in step S707. The parameter Id is adjusted to the colorless light source color set in step S705 and takes a value of (X,Y,Z)=(1.0, 1.0, 1.0). In the present exemplary embodiment, the XYZ value for the diffuse reflection component in the normal direction is calculated by selecting the diffuse reflection LUT corresponding to the illumination condition I. However a diffuse reflection color corresponding to the illumination condition I may also be calculated by a color matching process.

In step S709, the CPU 104 selects the specular reflection LUT corresponding to the input illumination condition I from the specular reflection LUT 306 for each light source prepared using the process illustrated in FIGS. 3A-B.

In step 710, the CPU 104 calculates the XYZ value of the specular reflection component in the specular reflection direction for light incident from a 45° angle by converting the image data 203 in the printer color space using the selected specular reflection LUT.

In step S711, the CPU 104 calculates the XYZ value (specular reflection color) of the specular reflection component in the line-of-sight direction based on the specular reflection formula 404. The parameter Ks in the specular reflection formula 404 is the XYZ value calculated in step S710. The parameter Is is adjusted to the colorless light source color set in step S705 and takes a value of (X,Y,Z)= (1.0, 1.0, 1.0). The parameter n represents the level of exitance of the glossiness and is a value obtained by converting the RGB value of the image data in the printer color space using the LUT (S307) for the extent of reflected light.

In step S712, the CPU 104 adds the specular reflection color calculated in step S711 and the diffuse reflection color calculated in step S708 according to the calculation formula 405 of the reflection color of the object and thereby calculates an XYZ value of the reflection color.

In step S713, the CPU 104 inputs the monitor profile. In step S714, the CPU 104 converts the XYZ value of the reflection color calculated in step S712 using the CMS engine 204 to an RGB value in the monitor color space and finishes the process.

FIG. 8 is a flowchart illustrating the flow of the processing until display of a 3D object 604 other than the print product 602 on the monitor.

In step S801, the CPU 104 inputs the respective colors of the 3D object 604.

In step S802, the CPU 104 inputs the illumination condition I in the virtual 3D object environment in FIG. 6A.

In step S803, the CPU 104 uses the processing illustrated in FIG. 5 to calculate an RGB value Ivs of the illumination I in the sRGB color space from the illumination condition I.

In step S804, the CPU 104 sets the light source color of the illumination 603 to Ivs. In step S805, the CPU 104 calculates the diffuse reflection color of the 3D object 604 from the diffuse reflection formula 402 using the light source color Ivs. Herein the light source color Ivs is set in Id and the color of the 3D object 604 multiplied by the reflection intensity of the print media is set in Kd.

In step S806, the CPU 104 calculates the specular reflection color for the 3D object 604 from the specular reflection formula 404 using the light source color Ivs. Herein Ivs is set in Is. The white color which is the gloss color, is multiplied by the reflection intensity, and an obtained value is set in Ks. In this manner, the specular reflection color to which the gloss color is added can be calculated.

In step S807, the CPU 104 adds the specular reflection color calculated in step S806 and the diffuse reflection color calculated in step S805 and thereby calculates the reflection color for the 3D object.

In step S808, the CPU 104 inputs the monitor profile. In step S809, the CPU 104 uses the CMS engine 204 to convert reflection color calculated in step S807 from the sRGB color space to the monitor color space, and then finishes the processing. In the above processing, a display color of the 3D object 604 on the monitor can be calculated.

In final processing, the results of the flowcharts illustrated in FIG. 7 and FIG. 8 are combined to execute rendering on the monitor. This processing is a processing example of a combination step. In this manner, the virtual 3D model in FIG. 6A is displayed on the monitor and the glossiness including the color in printing of the image data, the reflection such as illumination of the print product, or even the bronzing produced by the light source or the colorant can be reproduced. Accordingly, a print product that more closely approximates the actual product can be simulated.

In the present exemplary embodiment, although an sRGB color space is used in the color calculation in CG or the image data, another color space such as an Adobe RGB or the like can also be used. In the present exemplary embodiment, although the use of an XYZ color specification system has been described, a different color specification system such as an L*a*b* color specification system for CIE can be used.

Aspects of the present invention can also be realized by a computer of a system or apparatus (or devices such as a CPU or a micro-processing unit (MPU)) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., non-transitory computer-readable storage medium). The program includes computer-executable instructions for implementing the present invention.

An operating system (OS) or other application software running on a computer can execute part or all of actual processing based on instructions of the program to realize the functions one or more of the above-described exemplary embodiments.

Additionally, the program read out of a storage medium can be written into a memory of a function expansion card inserted in a computer or into a memory of a function expansion unit connected to the computer. In this case, based on instructions of the program, a CPU or MPU provided on the function expansion card or the function expansion unit can execute part or all of the processing to realize the functions of one or more of the above-described exemplary embodiments.

A wide variety of storage media may be used to store the program. The storage medium may be, for example, any of a flexible disk (floppy disk), a hard disk, an optical disk, a magneto-optical disk, a compact disc (CD), a digital versatile disc (DVD), a read only memory (ROM), a CD-recordable (R), a CD-rewritable, a DVD-recordable, a DVD-rewritable, a magnetic tape, a nonvolatile memory card, a flash memory device, and so forth.

As many apparently widely different embodiments of the present invention can be made without departing from the spirit and scope thereof, it is to be understood that the invention is not limited to the specific embodiments thereof except as defined in the appended claims.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-165125 filed Jul. 13, 2009, which is hereby incorporated by reference herein in its entirety.

What is claimed is:

1. A color processing apparatus configured to simulate a print product output by a printer on a monitor, the color processing apparatus comprising:
    a first conversion unit configured to convert color data representing an image of the simulation object into color data in a printer color space based on an illumination condition and a printer profile;
    a first calculation unit configured to calculate color data of diffuse reflection in a line-of-sight direction from color data in the printer color space using a diffuse reflection table corresponding to the illumination condition;
    a second calculation unit configured to calculate color data in the printer color space and specular reflection color data using a specular reflection table corresponding to the illumination condition;
    a third calculation unit configured to calculate color data of specular reflection in a line-of-sight direction from color data of specular reflection calculated using a parameter representing an exitance of the glossiness and colorless light-source color data;

a combination unit configured to combine the color data of diffuse reflection in a line-of-sight direction and color data of specular reflection in a line-of-sight direction; and a second conversion unit configured to convert the combined color data to color data in a color space of the monitor.

2. The color processing apparatus according to claim 1, wherein a parameter representing the exitance of the glossiness, a specular reflection table and a diffuse reflection table are produced by measuring the extent of the reflected light, the spectral reflectance in the specular direction and the spectral reflectance in the diffuse direction with reference to a patch output by the printer.

3. A method for simulating a print product output by a printer on a monitor, the method comprising:

converting color data representing an image of the simulation object, using a conversion unit, into color data in a printer color space based on an illumination condition and a printer profile;

calculating color data of diffuse reflection in a line-of-sight direction from color data in the printer color space using a diffuse reflection table corresponding to the illumination condition;

calculating color data in the printer color space and specular reflection color data using a specular reflection table corresponding to the illumination condition;

calculating color data of specular reflection in a line-of-sight direction from color data of specular reflection calculated using a parameter representing the exitance of the glossiness and colorless light-source color data;

combining the color data of diffuse reflection in a line-of-sight direction and color data of specular reflection in a line-of-sight direction; and converting the combined color data to color data in a color space of the monitor.

4. A computer-readable storage medium storing a program of computer-executable instructions which cause a color processing apparatus configured to simulate a print product output by a printer on a monitor, the program of computer-executable instructions comprising:

computer-executable instructions which convert color data representing an image of the simulation object into color data in a printer color space based on an illumination condition and a printer profile;

computer-executable instructions which calculate color data of diffuse reflection in a line-of-sight direction from color data in the printer color space using a diffuse reflection table corresponding to the illumination condition;

computer-executable instructions which calculate color data in the printer color space and specular reflection color data using a specular reflection table corresponding to the illumination condition;

computer-executable instructions which calculate color data of specular reflection in a line-of-sight direction from color data of specular reflection calculated using a parameter representing the exitance of the glossiness and colorless light-source color data;

computer-executable instructions which combine the color data of diffuse reflection in a line-of-sight direction and color data of specular reflection in a line-of-sight direction; and computer-executable instructions which convert the combined color data to color data in a color space of the monitor.

* * * * *